US010583765B2

(12) United States Patent
Jain (10) Patent No.: US 10,583,765 B2
(45) Date of Patent: *Mar. 10, 2020

(54) STORAGE COMPARTMENT COMPRISING A FOLDABLE HOLDER ELEMENT

(71) Applicant: FAURECIA INTERIOR SYSTEMS INDIA PRIVATE LIMITED, Bhosari, Pune, MH (IN)

(72) Inventor: Chetan Jain, Pune (IN)

(73) Assignee: FAURECIA INTERIOR SYSTEMS INDIA PRIVATE LIMITED, Bhosari, Pune, MH (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,377

(22) Filed: Jun. 26, 2018

(65) Prior Publication Data

US 2019/0001855 A1 Jan. 3, 2019

(30) Foreign Application Priority Data

Jun. 29, 2017 (IN) .............................. 201721022854

(51) Int. Cl.
*A47K 1/08* (2006.01)
*B60N 3/10* (2006.01)

(52) U.S. Cl.
CPC ............. *B60N 3/102* (2013.01); *B60N 3/108* (2013.01)

(58) Field of Classification Search
CPC ............. B60N 3/02; B60N 3/10; B60N 3/108
See application file for complete search history.

(56) References Cited

U.S. PATENT DOCUMENTS

| 5,618,018 A * | 4/1997 | Baniak | B60N 3/102 224/483 |
| 5,829,726 A * | 11/1998 | Withun | B60N 3/102 248/311.2 |
| 5,845,888 A * | 12/1998 | Anderson | B60N 3/102 248/311.2 |
| 5,899,426 A * | 5/1999 | Gross | B60N 3/102 224/926 |
| 6,065,729 A * | 5/2000 | Anderson | B60N 3/102 224/282 |
| 7,571,885 B2 * | 8/2009 | Katagiri | B60N 3/101 224/483 |
| 9,809,141 B2 * | 11/2017 | Jain | B60N 3/102 |

* cited by examiner

*Primary Examiner* — Amy J. Sterling
(74) *Attorney, Agent, or Firm* — Reising Ethington P.C.

(57) ABSTRACT

A mechanism for holding an article in a storage compartment. The storage compartment is delimited by a first wall and a second wall and each of the first wall and the second wall is having a first recess and a second recess. The mechanism includes a holder element, a supporting element, a locking element and a handling member. The holder element is articulated in the first wall. The supporting element is pivotally configured on the holder element for supporting a bottom portion of the article in a holding position. The locking element engages a first recess to lock the holder element in a non-holding position and engages a second recess to lock the holder element in the holding position. The handling member is configured on the second member for unlocking the locking element from the first and second recesses to move the holder element between the holding and non-holding positions.

20 Claims, 5 Drawing Sheets

STORAGE COMPARTMENT COMPRISING A FOLDABLE HOLDER ELEMENT

TECHNICAL FIELD

The present invention relates to a holder for a vehicle. More particularly, the present invention relates to a mechanism for holding article interior to a vehicle.

BACKGROUND

Cup holders are known to allow the users of a vehicle to safely store their beverages without the risk of spilling liquid in the vehicle. Specifically, some of the cup holders are preferably retractable such that they do not occupy space in the compartment of the vehicle when they are not in use. However, even in the retracted position, part of the holder element remains visible to the users, for example a front flap or another actuation element which has to be accessible to move the holder element to its deployed position. Such a visible part can be detrimental to the aspect of the interior of the vehicle and also does not appeal aesthetically.

Furthermore, the holder elements generally occupy an important space in the retracted position. For example, holder elements which can be moved as drawers between the retracted and deployed positions require a large space to store the holder elements in the retracted position.

It would therefore be desirable to provide a mechanism for holding article in the storage compartment which can overcome few or all of the disadvantage of the prior art.

SUMMARY

An object of the present invention is to provide a mechanism for holding an article in a storage compartment of a vehicle.

Another object of the present invention is to provide a mechanism for holding article in a storage compartment of a vehicle, wherein mechanism is foldable.

Yet another object of the present invention is to provide a mechanism for holding article in a storage compartment of a vehicle, wherein the mechanism enables in unlocking a holder element easily.

One more object of the present invention is to provide a mechanism for holding article in a storage compartment of a vehicle, wherein the mechanism is robust in construction.

A further object of the present invention is to provide a mechanism for holding article in a storage compartment, wherein the mechanism is aesthetically pleasing.

According to the present invention, there is provided a mechanism for holding an article in a storage compartment of a vehicle. The storage compartment is delimited by a first wall and a second wall and the first wall and the second wall are having a first recess and at least one second recess, respectively. The storage compartment comprises an upper opening extending between the upper ends of the first wall and of the second wall. Opposite to the upper opening, the storage compartment may comprise a bottom wall. The upper opening gives access to the storage compartment for placing and retrieving articles in and from the storage compartment. Further, the mechanism includes a holder element, a supporting element, a locking element and a handling member.

The holder element is pivotally configured on the first wall such that the holder element moves around the pivotal axis to configure a holding position. The holder element is to hold the articles in the storage space of the storage compartment. Specifically, the holder element is segmented into a first member and a second member which are telescopically configured and connected to each other with a biasing member in between. The first and second member enclose an opening for receiving the article.

Further, the bottom portion of the article is received and supported by the supporting element configured on the holder element. The supporting element is pivotally configured on the first member for supporting a bottom portion of the article in the holding position. The supporting element is having a support surface which extends away from an opening of the holder element. The support surface may be parallel to the opening and can support the bottom of an article extending through the opening.

Further, the distal end of the holder element is provided with the locking element. The locking element restricts the movement of the holder element in the holding position and the non-holding position. The locking element is a tab protruding axially from the second member of the holder element. Specifically, the locking element locks the holder element in the first recess in the non-holding position and locks the holder element in the second recess in the holding position. The telescopic movement of the second member release the locking element from the first recess and the second recess by moving the second member in the direction of the first member or in the direction of the pivotal axis. The holder element may comprise a biasing element that forces the two members into a position relative to each other that allows locking of the locking element in the first and second recess.

The handling member is configured on the holder element for operating the holder element in holding and non-holding position. In a first embodiment, a rigid handling member is pivotally configured on the second member. Specifically, the handling member is configured on the second member for unlocking the locking element from the first recess to move the holder element to the holding position. Preferably, the handling member is configured at the inner side of the second member within the opening that is enclosed by the first and the second member for receiving an article. Similarly, the handling member unlocks the locking element from the second recess to move the holder element to the non-holding position. The pivotable handling member can be pushed aside by inserting an article in the holder element when the holder is in the holding position. In an embodiment, the handling member is a rigid member with semicircular configuration. In an alternate embodiment, the handling member is a flexible strap configured on the second element.

A spring may be arranged between the handling member and the second member for providing a bias position of the handling member. The spring forces the handling member in a bias position in case that this movement is not hindered by an article placed in the cup holder. Preferably, the bias position is within the opening enclosed by the first and second member. This bias position allows easy access of the handling member.

BRIEF DESCRIPTION OF DRAWINGS

The advantages and features of the present invention will be understood better with reference to the following detailed description of some embodiments and claims taken in conjunction with the accompanying drawings, wherein like elements are identified with like symbols, and in which:

DETAILED DESCRIPTION

An embodiment of this invention, illustrating its features, will now be described in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The embodiment described below provides a mechanism for holding an article inside a vehicle specifically for holding articles in a cup holder. The mechanism is not limited to holding cups, but may also hold beverage cans and other tangible products. The mechanism is aesthetically pleasing. Further, the mechanism is simple in construction and does not take much space because of foldable holder element. Also, the mechanism is easy to operate and economical in construction.

The disclosed embodiments are merely exemplary of the invention, which may be embodied in various forms.

Figure 1:
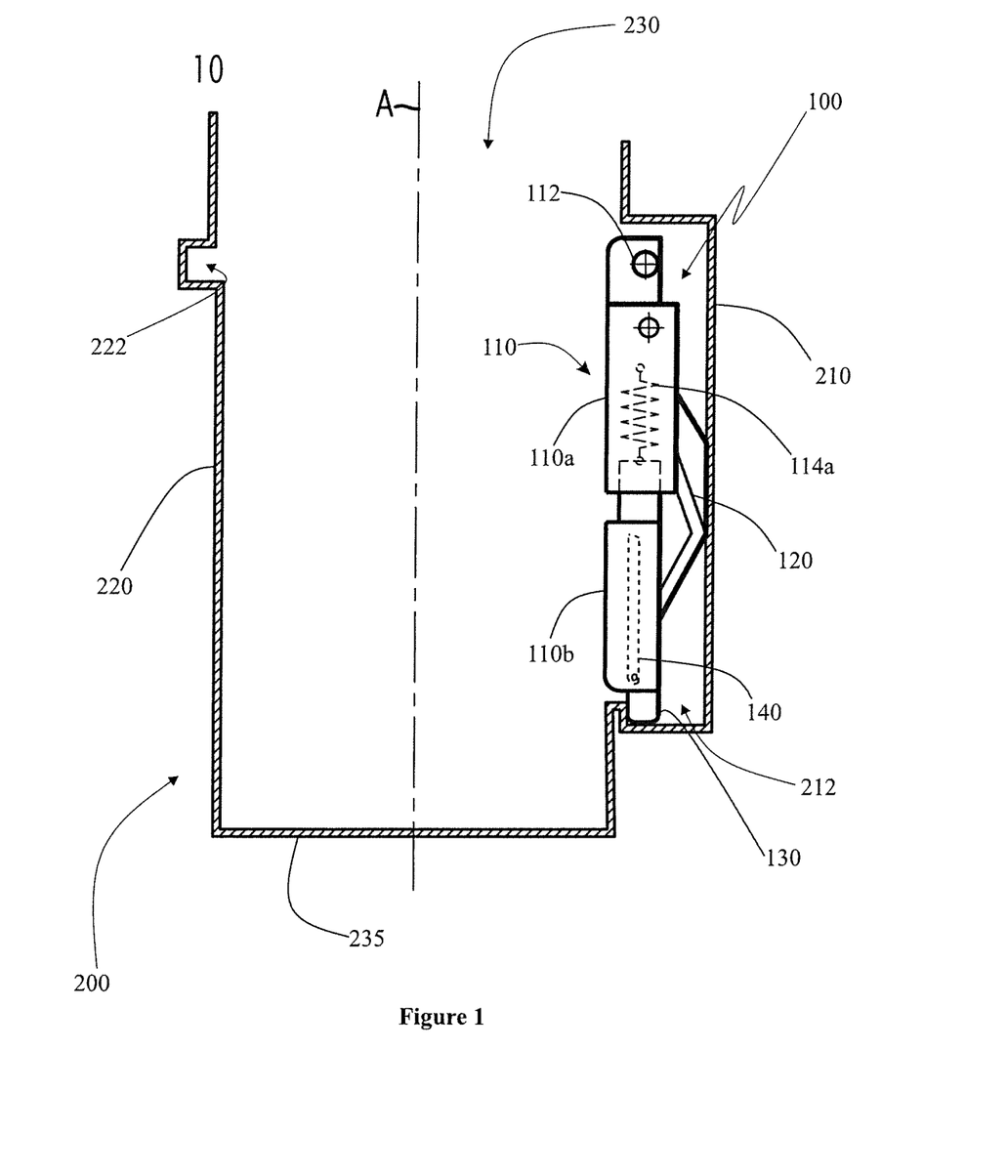
FIG. 1 illustrates a storage compartment for holding article having a mechanism in a non-holding position in accordance with the present invention.
Figure 2:
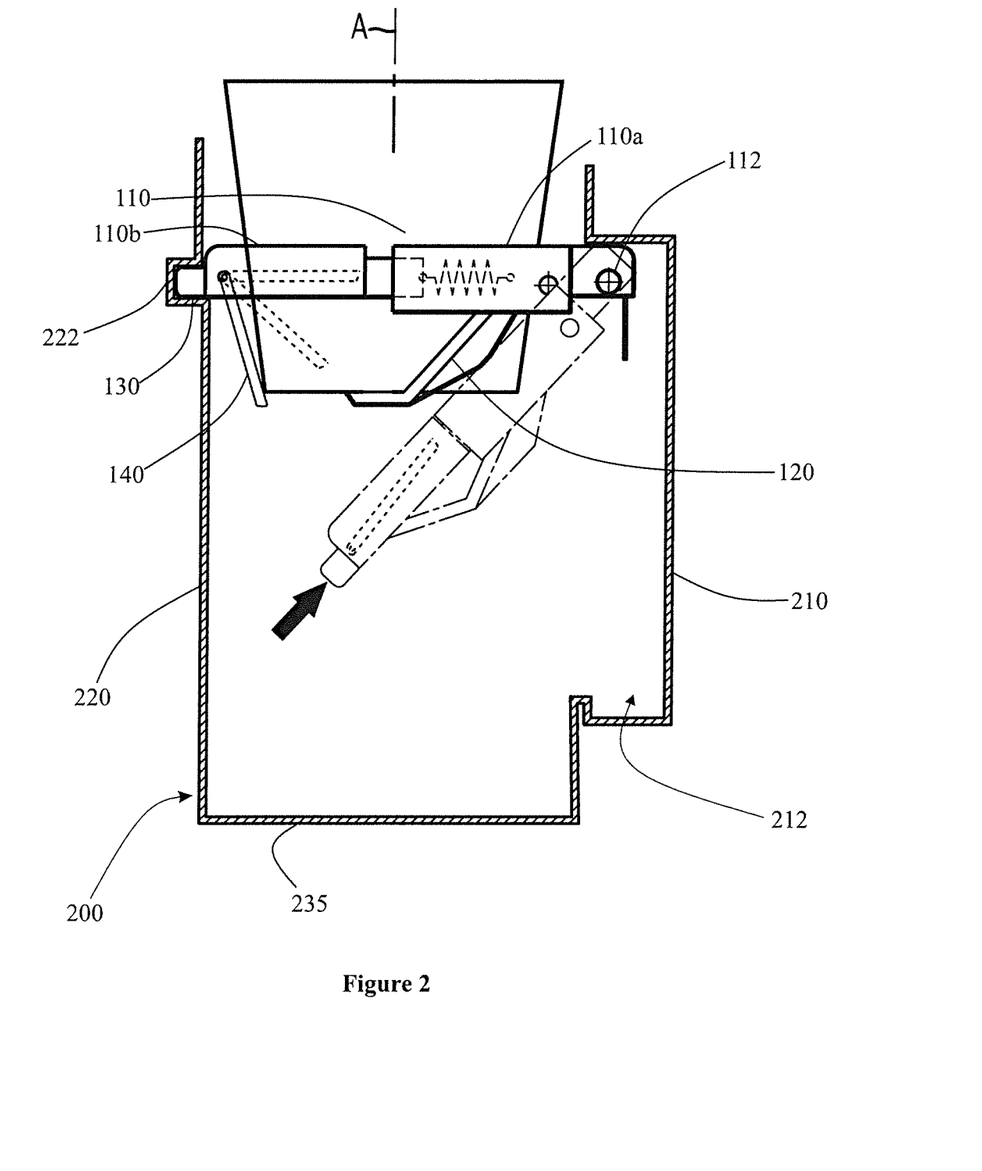
FIG. 2 illustrates the mechanism of FIG. 1 in a holding position.

Referring now to FIGS. 1 and 2, a storage compartment 200 for a vehicle in accordance with an embodiment of the present invention is illustrated. The storage compartment 200, for example forms a part of a central console of a vehicle or of a door panel or of a dashboard or of a back of a seat of another part of the interior of the vehicle.

The storage compartment 200 is sized to receive small articles, such as coins, keys, mobile phones, cards, beverage cans, water bottles or other small articles. The storage compartment 200 is delimited at least by a first wall 210 and a second wall 220. The second wall 220 extends opposite to the first wall 210. The storage compartment 200 comprises an upper opening (not numbered) extending between upper ends of the first wall 210 and of the second wall 220 opposite a bottom wall 235, this also defining a storage space 230. The walls of the storage compartment 200 may be solid walls in order to allow storing even the smallest articles. However, the walls, or some of the walls may be partly open. The upper opening provides access to the storage compartment 200 for placing and retrieving articles in and from the storage compartment 200. In a preferred embodiment there is sufficient room for storing small articles in the storage compartment 200 below the supporting element 120 even when the storage compartment 200 is used as a cup holder. When the cup holder is not in use, the storage compartment 200 can be used for storing larger articles.

Further, the storage compartment 200 is provided with at least one recess in both the first wall 210 and the second wall 220. Specifically, a first recess 212 and at least one second recess 222 are configured on the first wall 210 and the second wall 220 respectively. The first recess 212 is configured on a side portion of the first wall 210 with a locking surface 212a on a bottom portion. The storage compartment 200 also includes a mechanism 100 for holding articles, such as cups, beverage cans etc. in the storage space 230 provided within. The mechanism 100 includes a holder element 110, a supporting element 120 and at least one locking element 130.

Figure 3:
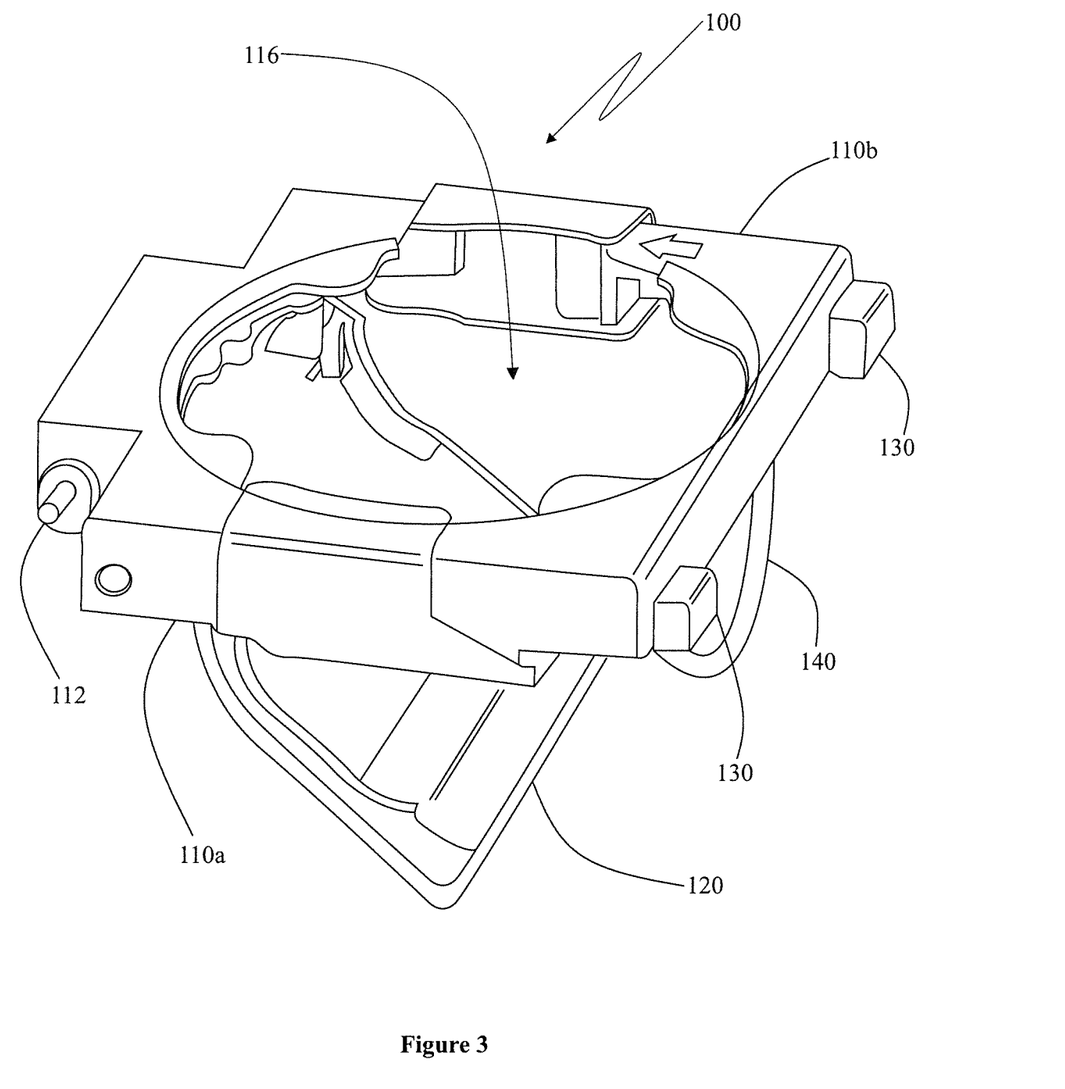
FIG. 3 illustrates perspective view of the mechanism of FIG. 2 without showing the article.
Figure 4:
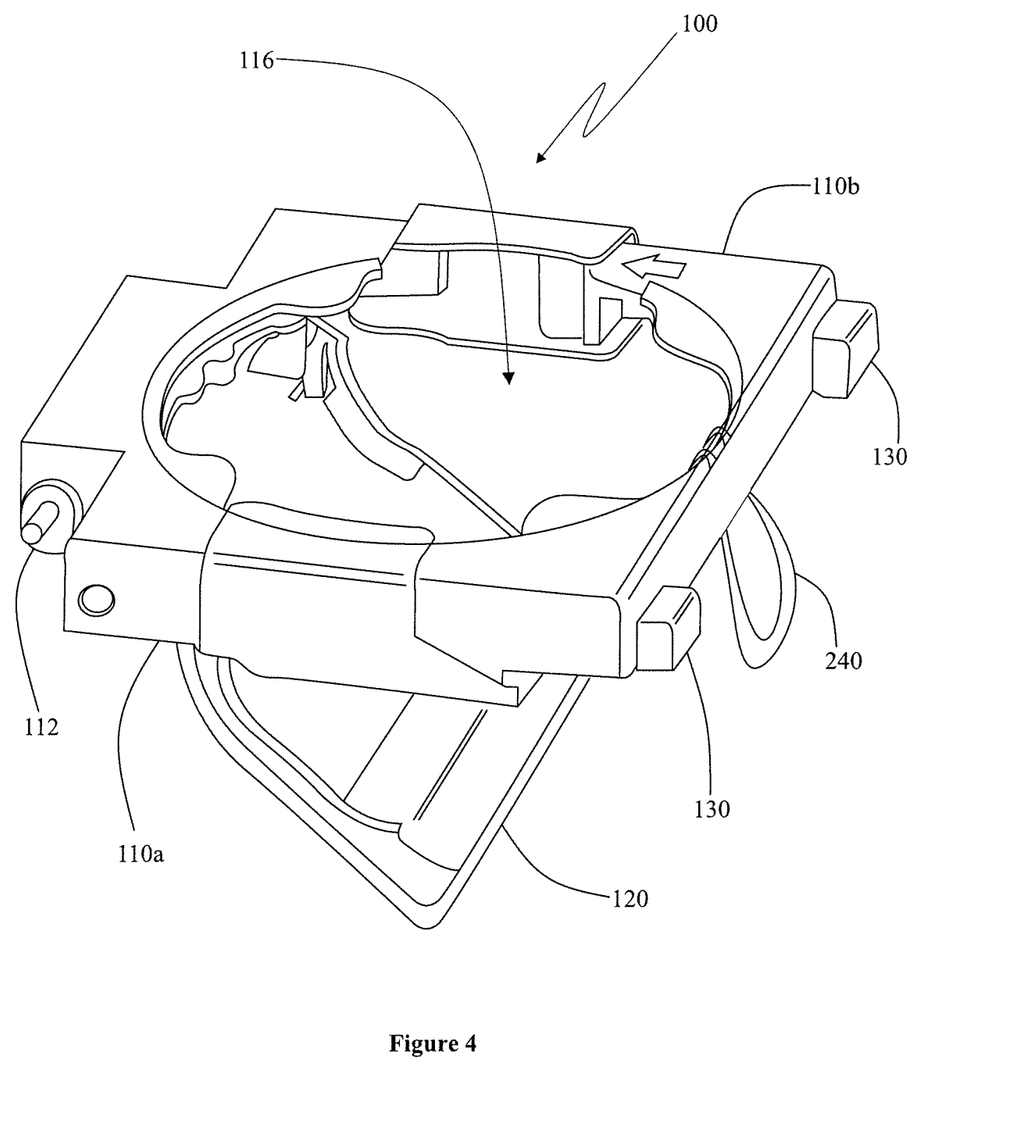
FIG. 4 illustrates a perspective view of another embodiment of the mechanism in its holding configuration for holding articles in the storage compartment.
Figure 5:
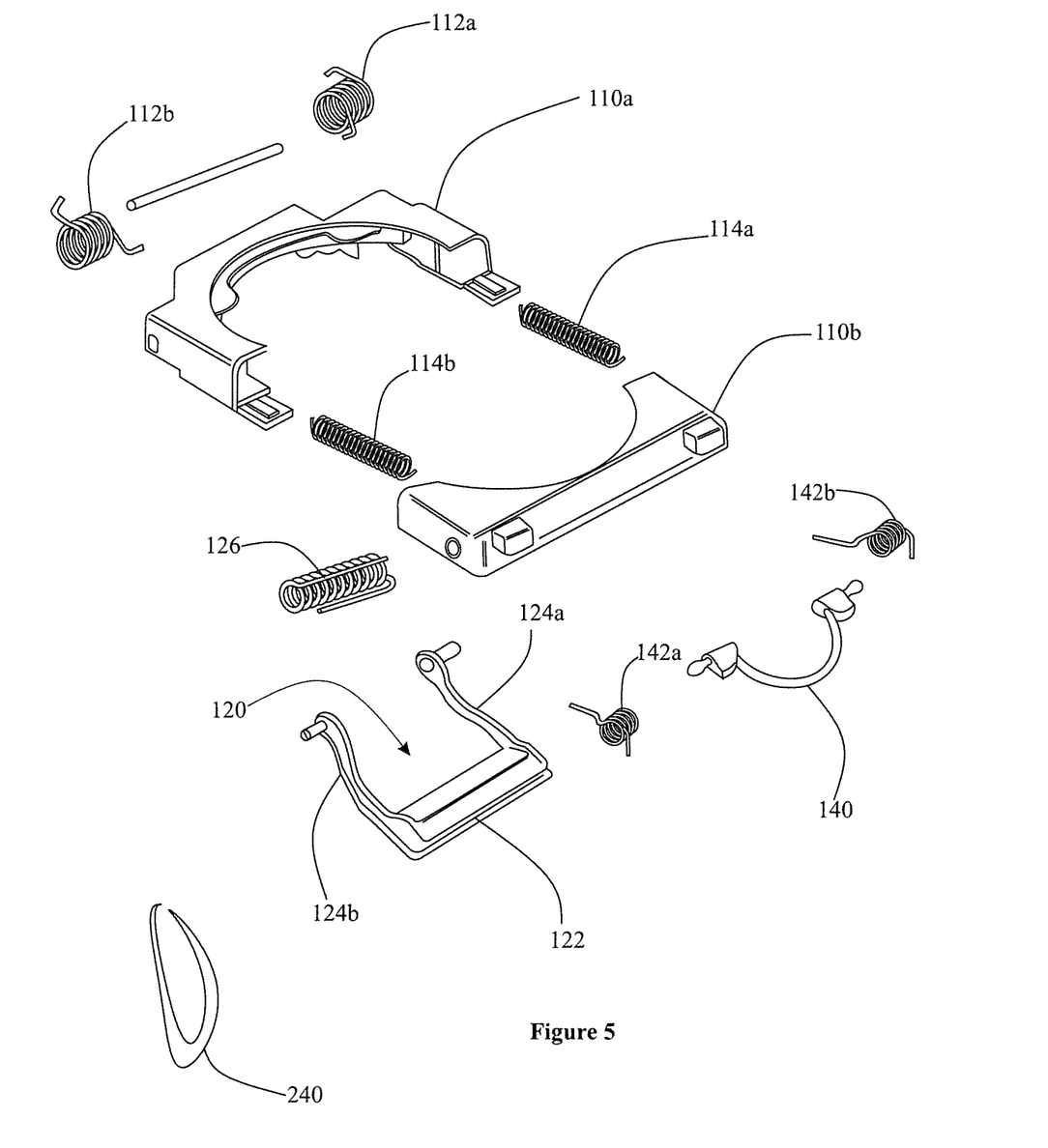
FIG. 5 illustrates an exploded view of the mechanism in accordance with the present invention.

Referring now to FIGS. 3, 4 and 5, the holder element 110 is pivotally configured on the first wall 210 such that the holder element 110 moves around a pivotal axis 112 to configure a holding position as shown in FIGS. 2 and 3. For clearness, no cup or other article is shown in the FIGS. 3 and 4. The holder element 110 is adapted to hold the articles in the storage space 230 of the storage compartment 200. The holder element 110 is pivoted along a pivotal axis 112 with torsion springs 112a and 112b. These torsion springs 112a and 112b force the holder element 110 to a holding position after it is unlocked from the non-holding as shown in FIG. 1. In the present embodiment, the holder element 110 is articulated on the first wall 210. Specifically, the holder element 110 is segmented into a first member 110a and a second member 110b. The first member 110a is pivotally connected to the first wall 210 and the second member 110b is attached to the first member 110a. More particularly, the first member 110a and the second member 110b are telescopically configured and connected to each other with a biasing member therebetween. By way of non-limiting example, two biasing member 114a and 114b are provided on sides of the first member 110a to provide telescopic movement between the first member 110a and the second member 110b as shown in FIG. 5. The biasing member 114a and 114b may be for example helical springs. In the present embodiment, the biasing member 114a and 114b is a compression spring. Preferably, the telescopic movement, more in particular the extension of the two members relative to each other is limited by a blocking element, for example a protrusion.

The holder element 110 is provided with an opening 116 as shown in FIGS. 3, and 4 to receive the articles, such as cups or cans and the like to hold the articles therein. Specifically, the first member 110a and the second member 110b together forms the opening 116 to receive the articles. In the present embodiment, the first member 110a and the second member 110b is an arc shaped structures together forming an opening 116 to receive the articles therein. The opening 116 is expandable and retractable based on the size of the article to be held therein.

Further, a bottom portion of the article is received and supported by the supporting element 120 extending from the holder element 110 towards the bottom wall 235. For holding a cup or can, the bottom wall 235 may be absent because the bottom wall has no function in holding the cup or can. However, the bottom wall 235 is preferred in order to allow the multiple use as mentioned above. Specifically, the supporting element 120 is pivotally configured along with a resilient member 126 (shown in FIG. 5) on the first member 110a for supporting the bottom portion of the article in the holding position. The resilient member 126 provides a biasing force for placing the supporting element 120 into a bias position. By way of non-limiting example, the supporting element 120 is having a support surface 122 as shown in FIG. 5 to receive the bottom portion of the article.

The support surface 122 extends away from the opening 116 such that the support surface 122 is parallel to the opening 116 and can support the bottom portion of an article, such as beverage containers, cans, water bottles that are extending through the opening 116. The support surface 122 can for example be a rod or a small shelf. The supporting element 120 is attached to the first member 110a in an articulated manner. Specifically, the supporting element 120 is having two extending arms 124a and 124b extended from both side of the support surface 122 to connect with the first member 110a. The supporting element 120 moves downwards upon receiving the articles in the holder element 110 and retracts toward the holder element 110 upon removal of the article therefrom in a bias position.

Referring again to FIGS. 1, 2 and 3, the distal end of the holder element 110 is provided with at least one locking element 130. In the present embodiment, two locking elements 130 are used. The locking elements 130 restricts the movement of the holder element 110 in holding position and non-holding position. In addition, the locking elements 130 allows bearing of the holder element 110 by the second wall 220. Each of the locking element 130 is a tab protruding from the second member 110b in a direction away from the pivotal axis 112 of the holder element 110 in the direction of the second wall 220 of the storage compartment 200. Specifically, each of the locking element 130 engages the first recess 212 and thereby locks the holder element 110 in the non-holding position and engages the second recess 222 and thereby locks the holder element 110 in the holding position. In the present embodiment, one second recess 222 is provided to engage with both the locking elements 130. The telescopic movement of the second member 110b release the locking elements 130 from the first recess 212 and the second recess 222 for moving the holder element 110 between the holding position and the non-holding position. Pulling the first member 110a of the holder element 110 in the direction of the pivotal axis 112 will reduce the opening 116 between the first member 110a and the second member 110b and will release the locking elements 130 from the first recess 212. In the present embodiment, two locking elements 130 are provided on either sides of the second member 110b. The holder element 110 is operated manually by the handling member 140.

The handling member 140 is configured on the holder element 110 for operating the holder element 110 for unlocking from the holding position and the non-holding position. In a first embodiment, the handling member 140 is pivotally configured along with two torsion springs 142a and 142b on the second member 110b as shown in FIGS. 1, 2, 3 and 5. Specifically, the handling member 140 is configured on the second member 110b for unlocking the locking elements 130 from the first recess 212 to move the holder element 110 to the holding position. Similarly, the handling member 140 unlocks the locking elements 130 from the second recess 222 to move the holder element 110 to the non-holding position. Upon pulling the handling member 140 towards the first member 110a, the second member 110b and the locking elements 130 moves away from the recess 212 or 222 depending on the position. The resilient property of the biasing members 114a and 114b allows retracting of the locking elements 130 and the second member 110b. When the driver or other user of the cup holder releases the handling member 140, then the second member 110b will extend from the first member 110a until it is blocked either by the wall of one of the recesses 212 or 222 or by a blocking element (not shown in figures) in the holder element 110. The blocking element limits the telescopic extension of the second member 110b from of the first member 110a and so also maximizes the size of the opening 116 for receiving a cup or can. In this embodiment, the handling member 140 is a rigid member with semi-circular configuration and accessible from outside for manual operation. It may be obvious to a person skilled in the art to provide any other shape irrespective of dimensions for the handling member 140.

Specifically, in this embodiment as shown in FIG. 3, the handling member 140 is a semi-circular member pivoted to the second member 110b. The handling member 140 is rotatable around a pivotal axis. The handling member 140 moves towards the supporting element 120, when the article is inserted into the opening 116. To force the handling member 140 back into a horizontal position on removal of the article, one or two springs, for example torsion springs 142a and 142b as shown in FIG. 5 can be arranged between the handling member 140 and the second member 110b for providing a bias position of the handling member 140. The bias position of the handling member 140 is within the opening 116 for receiving the article. The handling member 140 provides an extra support to the articles held therein. The locking elements 130 is unlocked from the first recess 212 or from the second recess 222 upon pulling the handling member 140 from the non-holding or holding positions. It may be obvious to a person skilled in the art to configure the handling member 140 in any other obvious configuration to unlock the locking elements 130 from the first recess 212 and the second recess 222.

In a second embodiment as shown in FIGS. 4 and 5, the handling member 240 is a flexible strap configured on the second member 110b. Upon pulling the flexible strap towards the first member 110a, the second member 110b and the locking elements 130 moves toward the first member 110a thereby releasing the locking elements 130 from the recesses 212 or 222 provided in the walls 210 and 220 respectively to configuring non-holding position or holding position respectively. Similar to the embodiment comprising a rigid handling member 240. Preferably, the strap is attached at the upper side of the member to allow optimum access. By way of non-limiting example, the flexible strap is a flexible membrane arranged on the second member 110b which can be easily accessible for operation.

An advantage of the illustrated embodiment is that it provides the mechanism 100 for unlocking the holder element 110 that is used to hold the article inside a vehicle. The mechanism 100 is not limited to holding cups, but may also hold beverage cans, water bottles and other similar products. The mechanism 100 is aesthetically pleasing. Further, the mechanism 100 is simple in construction and does not take much space for the underneath mechanism. Also, the mechanism 100 is easy to operate and economical in construction.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

The invention claimed is:

1. A mechanism for holding an article in a storage compartment of a vehicle, the storage compartment being delimited by at least a first wall and a second wall extending opposite to the first wall, the first wall and the second wall comprising a first recess and at least one second recess respectively, wherein the mechanism comprises:
   a holder element having a first member and a second member, which first and second member enclose an opening for receiving the article, wherein the holder element is articulated in the first wall;
   a supporting element pivotally configured on the holder element for supporting a bottom portion of the article in a holding position; and
   at least one locking element configured on a distal end of the holder element, wherein the locking element engages the first recess to thereby lock the holder element in a non-holding position and engages the second recess to thereby lock the holder element in the holding position;
   wherein a handling member is configured on the second member for unlocking the locking element from the first recess to move the holder element to the holding position and unlocking from the second recess to move the holder element to the non-holding position, and
   wherein the locking element is unlocked from the first recess or the second recess upon pulling the second member in the direction of the first member.

2. The mechanism as claimed in claim 1, wherein the handling member is a rigid member pivotally configured on the second member.

3. The mechanism as claimed in claim 1, wherein the handling member is configured at an inner side of the second member within the opening for receiving the article.

4. The mechanism as claimed in claim 1, wherein a spring is arranged between the handling member and the second member for providing a bias position of the handling member.

5. The mechanism as claimed in claim 4, wherein the bias position of the handling member is within the opening for receiving the article.

6. The mechanism as claimed in claim 1, wherein the handling member is a flexible strap.

7. The mechanism as claimed in claim 1, wherein the first member and the second member are telescopically configured and connected by a biasing member.

8. A mechanism for holding an article in a storage compartment of a vehicle, the storage compartment being delimited by at least a first wall and a second wall extending opposite to the first wall, the first wall and the second wall comprising a first recess and at least one second recess respectively, wherein the mechanism comprises:
   a holder element having a first member and a second member, which first and second member enclose an opening for receiving the article, wherein the holder element is articulated in the first wall;
   a supporting element pivotally configured on the holder element for supporting a bottom portion of the article in a holding position; and
   at least one locking element configured on a distal end of the holder element, wherein the locking element engages the first recess to thereby lock the holder element in a non-holding position and engages the second recess to thereby lock the holder element in the holding position,
   wherein a handling member is configured on the second member for unlocking the locking element from the first recess to move the holder element to the holding position and unlocking from the second recess to move the holder element to the non-holding position, and
   wherein the first member and the second member are telescopically configured and connected by a biasing member.

9. The mechanism as claimed in claim 8, wherein the handling member is a rigid member pivotally configured on the second member.

10. The mechanism as claimed in claim 8, wherein the handling member is configured at an inner side of the second member within the opening for receiving the article.

11. The mechanism as claimed in claim 8, wherein a spring is arranged between the handling member and the second member for providing a bias position of the handling member.

12. The mechanism as claimed in claim 11, wherein the bias position of the handling member is within the opening for receiving the article.

13. The mechanism as claimed in claim 8, wherein the handling member is a flexible strap.

14. A mechanism for holding an article in a storage compartment of a vehicle, the storage compartment being delimited by at least a first wall and a second wall extending opposite to the first wall, the first wall and the second wall comprising a first recess and at least one second recess respectively, wherein the mechanism comprises:
   a holder element having a first member and a second member, which first and second member enclose an opening for receiving the article, wherein the holder element is articulated in the first wall;
   a supporting element pivotally configured on the holder element for supporting a bottom portion of the article in a holding position; and
   at least one locking element configured on a distal end of the holder element, wherein the locking element engages the first recess to thereby lock the holder element in a non-holding position and engages the second recess to thereby lock the holder element in the holding position, and
   wherein the locking element is unlocked from the first recess to move the holder element to the holding position or from the second recess to move the holder element to the non-holding position upon moving the second member in the direction of the first member.

15. The mechanism as claimed in claim 14, further comprising a handling member configured to move the second member in the direction of the first member to unlock the locking element from the first or second recess.

16. The mechanism as claimed in claim 15, wherein the handling member is a rigid member pivotally configured on the second member.

17. The mechanism as claimed in claim 15, wherein the handling member is configured at an inner side of the second member within the opening for receiving the article.

18. The mechanism as claimed in claim 15, wherein a spring is arranged between the handling member and the second member for providing a bias position of the handling member.

19. The mechanism as claimed in claim 18, wherein the bias position of the handling member is within the opening for receiving the article.

20. The mechanism as claimed in claim 15, wherein the handling member is a flexible strap.

\* \* \* \* \*